Oct. 22, 1957 — K. C. IRVINE — 2,810,333
MOTOR VEHICLE TRUNK VENTILATOR
Filed July 16, 1954
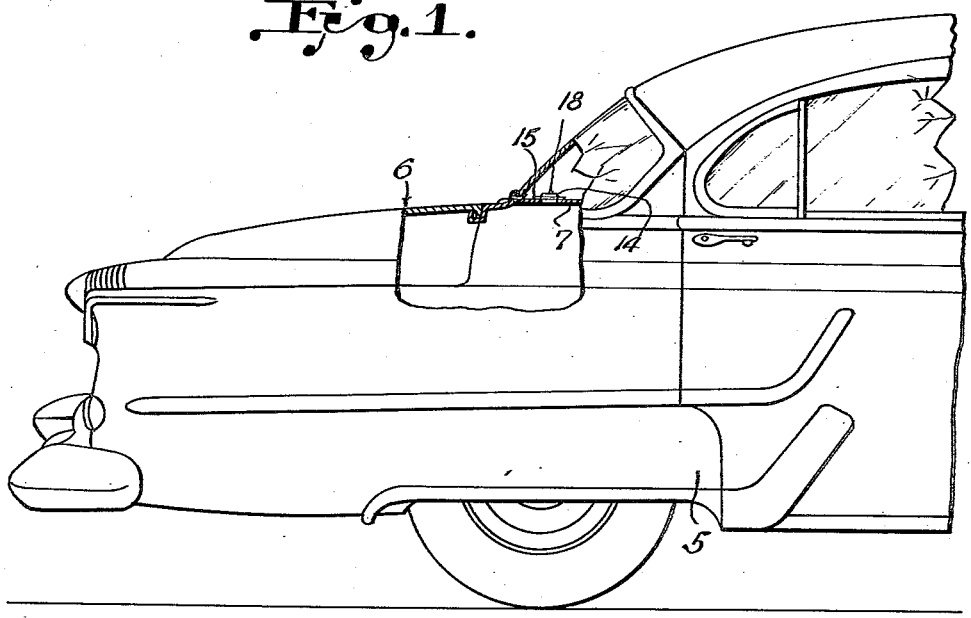
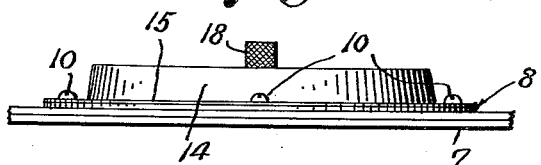
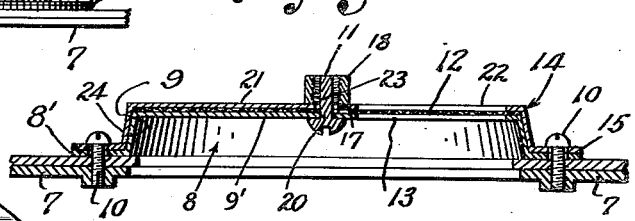
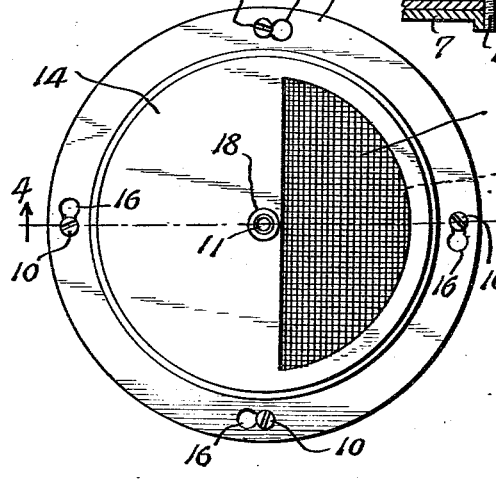
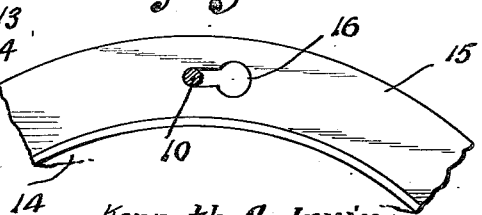
Kenneth C. Irvine
INVENTOR
BY *CA Snow & Co.*
ATTORNEYS.

United States Patent Office 2,810,333
Patented Oct. 22, 1957

2,810,333

MOTOR VEHICLE TRUNK VENTILATOR

Kenneth C. Irvine, Freehold, N. J.

Application July 16, 1954, Serial No. 443,924

1 Claim. (Cl. 98—2)

This invention relates to ventilators designed primarily for ventilating the trunks of motor vehicles, so that dogs or other animals may be transported therein without danger of suffocation.

An important object of the invention is to provide a ventilator of this character which may be readily and easily installed in the shelf located between the back seat and rear window of a motor vehicle, and which forms a part of the top of the trunk of the motor vehicle, thereby establishing communication between the trunk and interior of the car.

Still another object of the invention is the provision of a ventilator which may be readily installed by merely forming an opening in the shelf at the rear seat of the motor vehicle, and securing the ventilator directly thereover, the ventilator being of a construction to permit it to be completely or partially closed for controlling the ventilation of the trunk of the vehicle, as desired.

Referring to the drawing,

Figure 1 is a side elevational view of a portion of the rear end of a motor vehicle, a portion of the vehicle having been broken away, illustrating the location of the ventilator.

Figure 2 is an edge elevational view of the ventilator.

Figure 3 is a plan view thereof.

Figure 4 is a sectional view taken on line 4—4 of Figure 3.

Figure 5 is an enlarged fragmental plan view of the securing flange of the ventilator.

Referring to the drawing in detail, the reference character 5 indicates a portion of the body of a motor vehicle, and the reference character 6 indicates the trunk thereof.

The reference character 7 indicates the usual shelf which is disposed between the back of the rear seat of the vehicle and the rear window, the shelf forming a portion of the top of the trunk and dividing the trunk from the interior body of the vehicle.

The ventilator forming the subject matter of the present invention is secured directly over an opening formed in the shelf 7, which may be of a double thickness, as better shown by Figure 4 of the drawing, the ventilator embodying a stationary base generally indicated at 8 including a base flange 8' having formed integral therewith a frusto-conical side wall 9 and a top wall 9' having an opening 13 which extends over the side wall 9. The top wall 9' has a rectangular opening 20 through which a pivot screw extends.

A foraminous disc 12 engages over the top wall 9' and forms a screen for opening 13 to guard against insects entering the trunk through the ventilator.

The ventilator also includes an outer movable cover, generally indicated at 14, which includes a base 15 formed with keyhole openings 16 through which screws 10 engage. The screws 10 and openings 16 provide means to lock the cover 14 in selected open or closed position. The cover 14 includes a top wall 21 having an opening 22 adapted in one position of the cover to register with opening 13. Cover 14 includes a frusto-conical side wall 24 telescoping over side wall 9 of base 8.

The pivot screw 11 passes through an opening 23 in the top wall 21, and the knurled nut 18 threaded on screw 11 provides for locking or releasing cover 14 relative to base 8. When nut 18 is loosened, cover 14 may be turned to dispose the heads of screws 10 in the large ends of openings 16 so that cover 14 may then be raised slightly and lifted off of screws 10. Cover 14 may then be turned 90° or 180° to partially or completely close opening 13.

From the foregoing it will be seen that due to the construction shown and described, I have provided a ventilator which may be readily and easily positioned over an opening which may be formed in the usual horizontal shelf disposed at the rear of the rear seat of a motor vehicle between the rear seat and the rear windows thereof, and when it is desired to open the ventilator, it is only necessary to loosen screws 10 slightly to permit of rotation of the outer movable section 14 of the ventilator until the heads of screws 10 register with the large ends of the key holes 16. The outer movable section may now be lifted and rotated to either close or open the ventilator, whereupon the outer movable section will then be again positioned over the heads of the screws 10 and slightly moved in a circular direction to bring the heads of the screws 10 directly over the narrow portions of the keyhole openings 16. The screws 10 may now be tightened and the knurled nut 18 tightened to hold the ventilator in its adjusted position. When the ventilator is open to direct fresh air into the rear of the car, and it is desired to ventilate the trunk of the vehicle, it is only necessary to open one of the rear ventilating windows to direct fresh air into the rear of the vehicle, whereupon the draft of air entering the window will be drawn into the trunk and exhausted through the usual opening formed in the bottom of the trunk of the car through which the rear light wires extend thereby supplying sufficient ventilation for animals which may be transported in the trunk of the vehicle.

Having thus described the invention, what is claimed is:

A ventilator attachment adapted to be positioned over an opening formed in the shelf forming a part of the top of a motor vehicle trunk comprising a base member formed of an apertured annular flange, a frusto-conical side wall carried by said flange, a top wall carried by said flange having a substantially semi-circular opening, a cover engaging over said base member, said cover including an annular flange overlying said first named flange and formed with diametrically opposed pairs of keyhole openings, headed screws engaging through said openings and through said aperture in said first named flange, a frusto-conical side wall carried by said second named flange and telescoping over said first named side wall, a top wall carried by said second named side wall and having a substantially semi-circular opening adapted in one position of said cover to register with said first named opening, a disc-shaped screen interposed between said first and second named walls, a bolt extended through the axis of said first and second named top walls, and a nut threaded on said bolt releasably clamping said top walls in engaged relation.

References Cited in the file of this patent

UNITED STATES PATENTS

| 856,926 | Stevick | June 11, 1907 |
| 1,803,847 | Ellis | May 5, 1931 |
| 2,333,818 | Raney | Nov. 9, 1943 |